United States Patent
Nakagawa

(10) Patent No.: US 10,048,726 B2
(45) Date of Patent: Aug. 14, 2018

(54) DISPLAY CONTROL APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/041,452

(22) Filed: Feb. 11, 2016

(65) Prior Publication Data
US 2016/0239177 A1    Aug. 18, 2016

(30) Foreign Application Priority Data
Feb. 16, 2015 (JP) ................................. 2015-027507

(51) Int. Cl.
*G06F 3/0488* (2013.01)
*G06F 1/16* (2006.01)
(Continued)

(52) U.S. Cl.
CPC ............ *G06F 1/1652* (2013.01); *G06F 1/163* (2013.01); *G06F 1/1694* (2013.01);
(Continued)

(58) Field of Classification Search
CPC ...... G06F 1/1652; G06F 1/163; G06F 1/1694; G06F 3/0482; G06F 3/0485; G06F 2203/04102
See application file for complete search history.

(56) References Cited

U.S. PATENT DOCUMENTS

| | | | |
|---|---|---|---|
| 2013/0044215 A1* | 2/2013 | Rothkopf | G06F 1/163 348/143 |
| 2014/0029017 A1* | 1/2014 | Lee | G01B 11/24 356/601 |

(Continued)

FOREIGN PATENT DOCUMENTS

JP    2012-238005 A    12/2012

OTHER PUBLICATIONS iPhone 5 product description, released by Apple Inc., on sale on Sep. 21, 2012. pp. 4-5.*

*Primary Examiner* — Xiao Wu
*Assistant Examiner* — Chong Wu
(74) *Attorney, Agent, or Firm* — Cowan, Liebowitz & Latman, P.C.

(57) ABSTRACT

A display control apparatus that enables a user to see an end portion of a displaying object easily even when an information device is in a rolled shape. An operation unit receives a scrolling operation for scrolling a displaying object displayed on a predetermined display area of a bendable display unit. A control unit controls to scroll the displaying object so that an end of the displaying object in a first direction does not scroll beyond a first position in a second direction opposite to the first direction within the predetermined display area when the display unit is in a first shape, and controls to scroll the displaying object so that the end of the displaying object in the first direction is able to scroll beyond the first position in the second direction when the display unit is in a second shape that bends more than the first shape.

26 Claims, 15 Drawing Sheets

(51) Int. Cl.
*G06F 3/0485* (2013.01)
*G06F 3/0482* (2013.01)

(52) U.S. Cl.
CPC .......... *G06F 3/0482* (2013.01); *G06F 3/0485* (2013.01); *G06F 2203/04102* (2013.01)

(56) References Cited

U.S. PATENT DOCUMENTS

| | | | | |
|---|---|---|---|---|
| 2014/0098028 A1* | 4/2014 | Kwak | ...................... | G09G 5/00 345/173 |
| 2014/0118317 A1* | 5/2014 | Song | ..................... | G06F 1/1652 345/204 |

* cited by examiner (STRAIGHT STATE)

(ROLLED STATE)

DISPLAY CONTROL APPARATUS, CONTROL METHOD THEREFOR, AND STORAGE MEDIUM STORING CONTROL PROGRAM THEREFOR

BACKGROUND OF THE INVENTION

Field of the Invention

The present invention relates to a display control technique for a display control apparatus that is capable of bending a shape of a display unit.

Description of the Related Art

There is a generally known technique that displays a part of a displaying object in a predetermined display area of a display unit and displays another part of the displaying object by scrolling (i.e., a display range of the displaying objects is changed). A smart phone is an example of an apparatus equipped with a display unit. A smart phone has a rectangle plate shape centering on a display unit and cannot change the shape, in general. Against this, a technique about a bendable display is developed in recent years (see Japanese Laid-Open Patent Publication (Kokai) No. 2012-238005 (JP 2012-238005A)). An information device that can change its shape from a plate shape to a rolled shape (or a cylindrical shape) may be considered from this technique. Such an apparatus is usable in the plate shape when being held by a hand and is also usable in the rolled shape by winding around a wrist like a wrist watch.

However, when an apparatus that is designed for a usage in the plate shape is used in the rolled shape by winding around a wrist, there is a possibility that an end portion of a displaying object becomes difficult to be seen.

SUMMARY OF THE INVENTION

The present invention provides a display control technique that enables a user to see an end portion of a displaying object easily even when an information device is in a rolled shape.

Accordingly, a first aspect of the present invention provides a display control apparatus comprising an operation unit configured to receive a scrolling operation for scrolling a displaying object that is displayed on a predetermined display area of a bendable display unit, and a control unit configured to control to scroll the displaying object according to the scrolling operation so that an end of the displaying object in a first direction does not scroll beyond a first position in a second direction opposite to the first direction within the predetermined display area in a case where the bendable display unit is in a first shape, and to control to scroll the displaying object according to the scrolling operation so that the end of the displaying object in the first direction is able to scroll beyond the first position in the second direction in a case where the bendable display unit is in a second shape of which a bending degree is larger than that of the first shape.

Accordingly, a second aspect of the present invention provides a display control apparatus comprising an operation unit configured to receive a scrolling operation for scrolling a displaying object that is displayed on a predetermined display area of a bendable display unit, and a control unit configured to control to scroll the displaying object according to the scrolling operation so that the displaying object scrolls in a first direction until an end of the displaying object in the first direction moves to a first position in response to a termination of the scrolling operation after the displaying object is scrolled until the end of the displaying object in the first direction moves beyond the first position in a second direction opposite to the first direction within the predetermined display area during the scrolling operation in a case where the bendable display unit is in a first shape, and to control to scroll the displaying object according to the scrolling operation so that the displaying object scrolls in the first direction until the end of the displaying object in the first direction moves to a second position that shifts from the first position in the second direction within the predetermined display area in response to a termination of the scrolling operation after the displaying object is scrolled until the end of the displaying object in the first direction moves to the second position during the scroll operation in a case where the bendable display unit is in a second shape of which a bending degree is larger than that of the first shape.

Accordingly, a third aspect of the present invention provides a control method for a display control apparatus, the control method comprising an operation step of receiving a scrolling operation for scrolling a displaying object that is displayed on a predetermined display area of a bendable display unit, a first control step of controlling to scroll the displaying object according to the scrolling operation so that an end of the displaying object in a first direction does not scroll beyond a first position in a second direction opposite to the first direction within the predetermined display area in a case where the bendable display unit is in a first shape, and a second control step of controlling to scroll the displaying object according to the scrolling operation so that the end of the displaying object in the first direction is able to scroll beyond the first position in the second direction in a case where the bendable display unit is in a second shape of which a bending degree is larger than that of the first shape.

Accordingly, a fourth aspect of the present invention provides a control method for a display control apparatus, the control method comprising an operation step of receiving a scrolling operation for scrolling a displaying object that is displayed on a predetermined display area of a bendable display unit, a first control step of controlling to scroll the displaying object according to the scrolling operation so that the displaying object scrolls in a first direction until an end of the displaying object in the first direction moves to a first position in response to a termination of the scrolling operation after the displaying object is scrolled until the end of the displaying object in the first direction moves beyond the first position in a second direction opposite to the first direction within the predetermined display area during the scroll operation in a case where the display unit is in a first shape, and a second control step of controlling to scroll the displaying object according to the scrolling operation so that the displaying object scrolls in the first direction until the end of the displaying object in the first direction moves to a second position that shifts from the first position in the second direction within the predetermined display area in response to a termination of the scrolling operation after the displaying object is scrolled until the end of the displaying object in the first direction moves to the second position during the scroll operation in a case where the display unit is in a second shape of which a bending degree is larger than that of the first shape.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, a user is able to see an end portion of a displaying object easily even when an information device is in the rolled shape.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
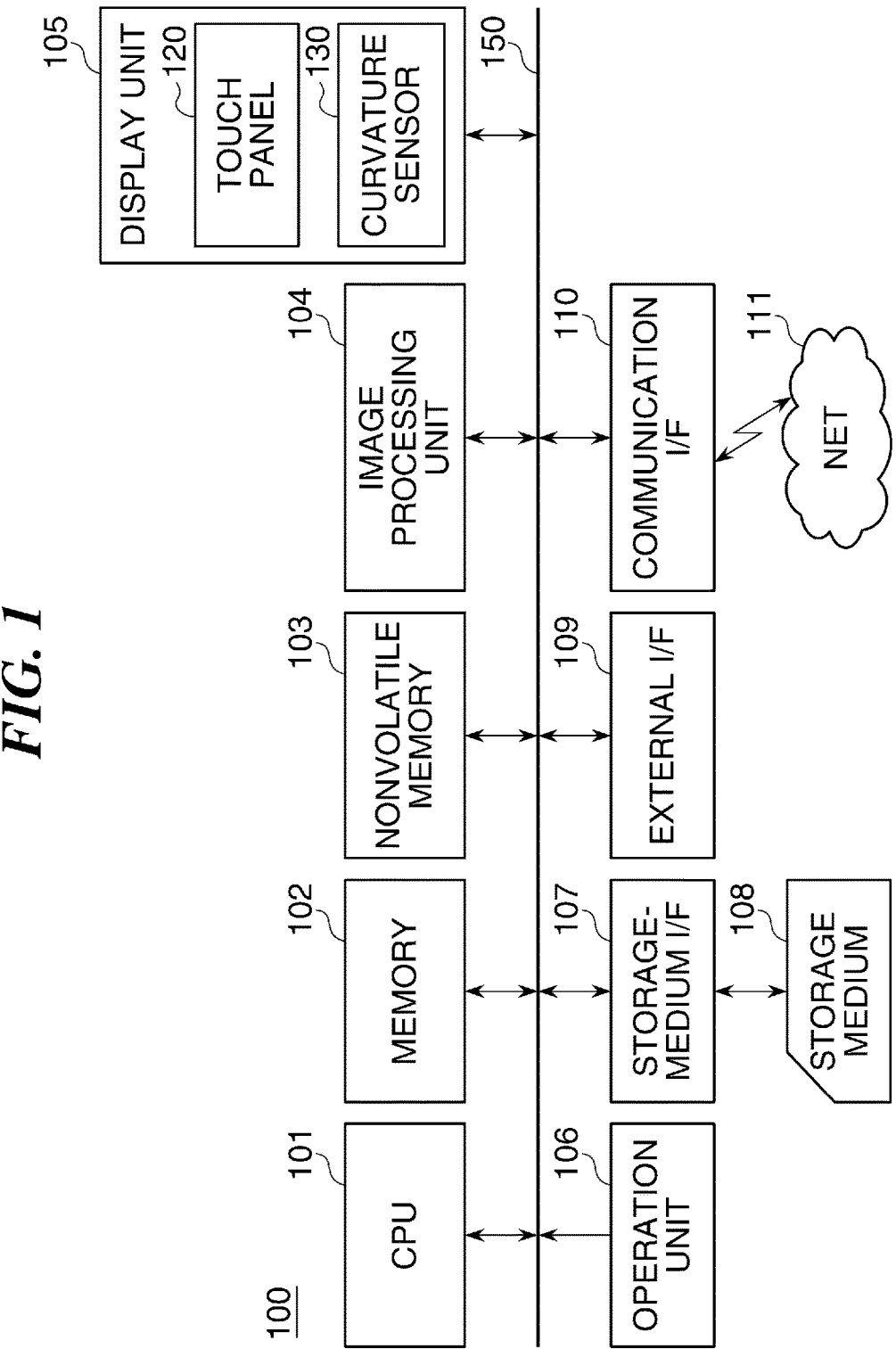
FIG. 1 is a block diagram schematically showing a configuration of an information device that is an example of a display control apparatus according to a first embodiment of the present invention.

First, a first embodiment of the present invention will be described. FIG. 1 is a block diagram schematically showing a configuration of an information device that is an example of a display control apparatus according to the first embodiment of the present invention.

As shown in FIG. 1, the information device 100 is a mobile phone, a smart phone, a tablet terminal or the like that is able to transform a tabular housing having a display unit into a rolled state (or cylindrical state) so as to be wound around a wrist like a wrist watch.

The information device 100 is provided with a CPU 101, a memory 102, a nonvolatile memory 103, an image processing unit 104, a bendable display unit (hereinafter referred to as a "display unit" simply) 105, an operation unit 106, a storage-medium I/F 107, an external I/F 109, and a communication I/F 110. These units allow transformation of housing, and exchange data through an internal bus 150.

The memory 102 is a RAM (a volatile memory using a semiconductor device), for example. The CPU 101 controls the units of the information device 100 according to programs stored in the nonvolatile memory 103, for example, while using the memory 102 as a work memory. The nonvolatile memory 103 consists of an EEPROM, for example, and stores various data including image data and voice data, various programs for operating the CPU 101, etc.

The image processing unit 104 applies various image processes to image data on the basis of control of the CPU 101. Image data stored in the nonvolatile memory 103 or the storage medium 108, a video signal obtained through the external I/F 109, image data obtained through the communication I/F 110, image data picked up by an image pickup unit (not shown) are subjected to the image processes. Moreover, the image processing unit 104 performs an A/D conversion process, a D/A conversion process, an encoding process for image data, a compression process, a decoding process, an expansion/reduction process (resizing), a noise reduction process, a color conversion process, etc. The image processing unit 104 may be constituted by exclusive circuit blocks each of which performs a specific image process. Moreover, the CPU 101 is able to apply an image process according to a program without using the image processing unit 104 depending on a type of an image process.

The display unit 105 displays a general image on the basis of control of the CPU 101, and also displays a GUI screen that constitutes a GUI (Graphical User Interface), etc. The CPU 101 controls each part of the information device 100 so as to generate and output a video signal for displaying on the display unit 105 to the display unit 105 on the basis of a display control signal that is generated according to a program. The display unit 105 displays a video image on the basis of the output video signal.

The display unit 105 is integrated with a curvature sensor 130 and a touch panel 120. The curvature sensor 130 is a bending sensor that is integrated with the display unit 105 and has a property of changing resistance between internal electrodes according to a bending degree. The touch panel 120 of a plane shape is piled up on the display unit 105, and outputs coordinate information corresponding to a contacted position. The touch panel 120 may employ any of various systems, such as a resistance film system, a capacitive sensing method, a surface acoustic wave system, an infrared system, an electromagnetic induction system, an image recognition system, a photosensor system.

The operation unit 106 includes input devices for receiving a user's operation, such as a text input device like a keyboard, a pointing device like the touch panel 120, a button, a dial, a joy stick, a touch sensor, a touchpad, etc.

The storage-medium I/F 107 is an interface for reading data from the storage medium 108 like a memory card and for writing data into the storage medium 108, on the basis of control of the CPU 101. The external I/F 109 is an interface for connecting with an external device (not shown) through a cable or a wireless connection to exchange a video signal and a sound signal. The communication I/F 110 is an interface for communicating (including telephone communication) with an external device (not shown), the Internet 111, etc., to transmit and receive various data.

The following operations and states to the touch panel 120 are detectable.
1. An operation that a finger or a pen that had not touched the touch panel newly touches the touch panel. That is a start of a touch (hereinafter referred to as Touch-Down).
2. A state where a finger or a pen keeps touching the touch panel (hereinafter referred to as Touch-On).
3. An operation that a finger or a pen moves while touching the touch panel (hereinafter referred to as Touch-Move).
4. An operation that a finger or a pen that had touched the touch panel is released. That is a termination of touch (hereinafter referred to as Touch-Up).
5. A state where nothing touches the touch panel (hereinafter referred to as Touch-Off).

When the Touch-Down is detected, the Touch-On is also detected simultaneously. Unless the Touch-Up is detected after the Touch-Down, the Touch-On usually continues being detected. The Touch-Move is detected in the state where the Touch-On is detected. Even if the Touch-On is detected, the Touch-Move is not detected if the touch position is not moving. After the Touch-Ups of all fingers and pens are detected, the Touch-Off is detected.

The above operation or state and the position coordinate at which the finger or the pen touches the touch panel are notified to the CPU 101 through the internal bus. The CPU 101 determines what operation was given on the touch panel based on the notified information. Regarding the Touch-Move, the moving direction of the finger or the pen that moves on the touch panel is determined as a vertical component and a horizontal component on the touch panel based on the change of the position coordinate.

Moreover, a continuous operation of the Touch-Down, the Touch-Move, and the Touch-Up on the touch panel draws a stroke. An operation to draw a stroke quickly is called a flick. The flick is an operation to move a finger while touching the touch panel in a certain distance quickly, and to release the finger. In the other words, the flick is an operation to follow the touch panel quickly so as to snap the touch panel with the finger. When the Touch-Move beyond a predetermined distance and beyond a predetermined speed is detected and the Touch-Up is then detected, it is determined that the flick operation has been performed.

When the Touch-Move beyond the predetermined distance in speed less than the predetermined speed is detected, it is determined that a drag has been performed.

The touch panel may employ any of various systems, such as a resistance film system, a capacitive sensing method, a surface acoustic wave system, an infrared system, an electromagnetic induction system, an image recognition system, a photosensor system. A system that detects a touch by a contact to the touch panel, or a system that detects a touch when a finger or a pen approaches the touch panel may be employed.

Figure 2:
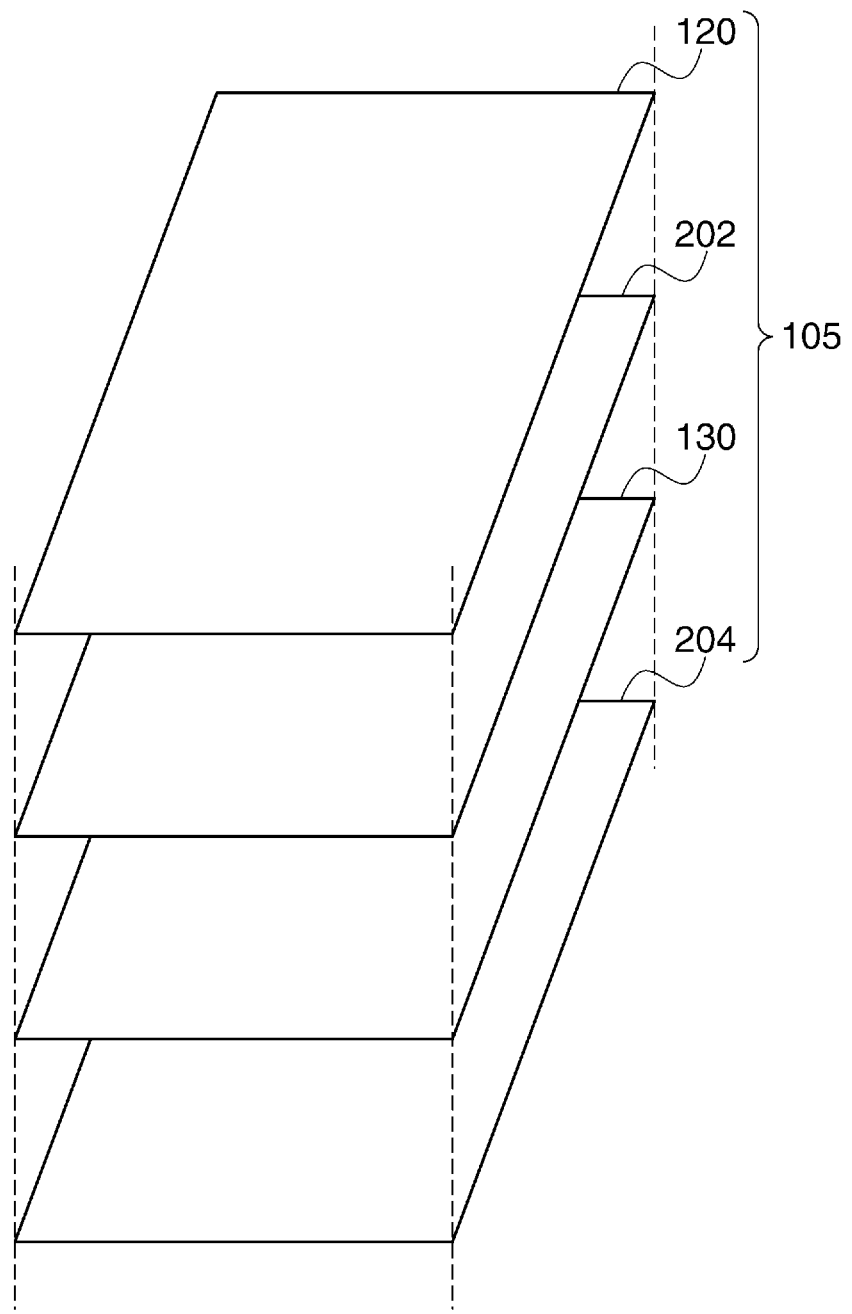
FIG. 2 is a view schematically showing a structure of a display unit in the information device in FIG. 1.

FIG. 2 is a view schematically showing a structure of the display unit 105 in the information device 100 in FIG. 1.

The display unit 105 consists of the touch panel 120, an organic EL display section 202, the curvature sensor 130, a back panels 204 for supporting the entire display unit 105.

The curvature sensor 130 has electrodes at the top end and the bottom end, and has a property of changing resistance between the electrodes according to a bending degree of the display unit 105. The electrode at the top end of the curvature sensor 130 is connected to a power source (not shown) through a resistance (not shown), and its junction is connected to an AD converter (not shown) of the CPU 101, too. The electrode of the bottom end of the curvature sensor 130 is connected to GND. Accordingly, the voltage input into the AD converter of the CPU 101 varies according to change of the resistance in the curvature sensor 130. Then, the CPU 101 detects the bending degree of the curvature sensor 130 by referring a value that is obtained by A/D-converting the voltage input into the AD converter. In this embodiment, when the bending degree of the curvature sensor 130 increases, the resistance between the electrodes shall increase, which shall heighten the voltage input into the AD converter of the CPU 101.

Figure 3A:
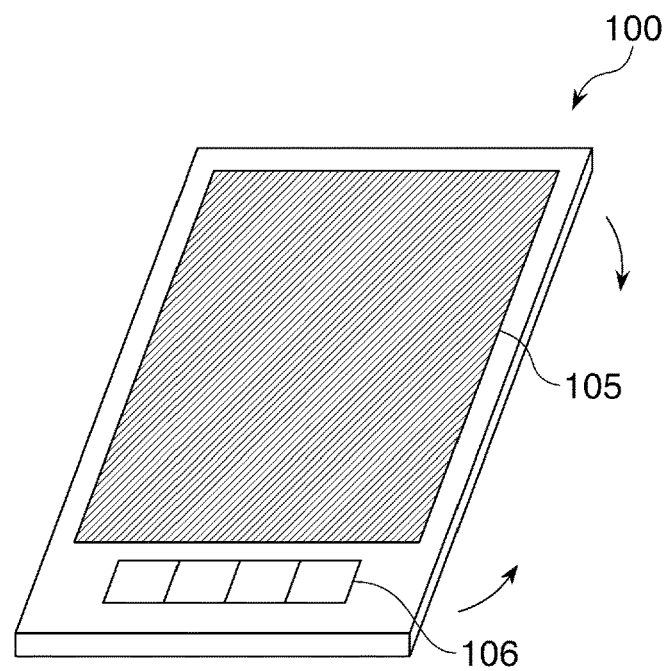
FIG. 3A is a perspective view showing a normal state (straight state) of the information device in FIG. 1 before transformation.
Figure 3B:
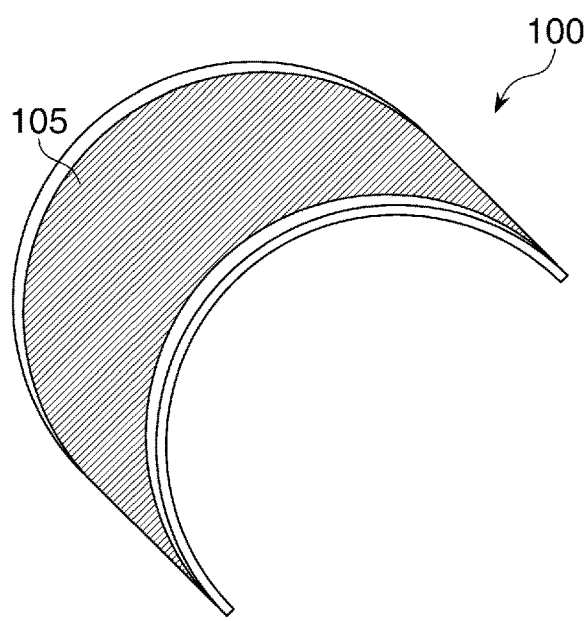
FIG. 3B is a perspective view showing a rolled state of the information device in FIG. 1 after the transformation.

FIG. 3A and FIG. 3B are perspective views showing states of the information device 100 in FIG. 1 before and after transformation.

The information device 100 usually exhibits a rectangular plate shaped housing as shown in FIG. 3A (hereinafter the state in FIG. 3A is referred to as a "straight state"). Moreover, the information device 100 is able to change its shape into a rolled shape by rounding the housing as shown in FIG. 3B (hereinafter the state in FIG. 3B is referred to as a "rolled state"). In the rolled state, a user can use the information device 100 by winding around a wrist like a wrist watch.

Thus, the CPU 101 determines whether the information device 100 equipped with the display unit 105 concerned is in the straight state or the rolled state according to the bending degree of the display unit 105 that is integrated with the curvature sensor 130. That is, the CPU 101 determines that it is in the rolled state (a second state, a second shape) when the detection result of the curvature sensor 130 shows that the display unit 105 bends more than a threshold. The state other than the rolled state is determined as the straight state (a first state, a first shape).

Although the example where the curvature sensor 130 and the display unit 105 are integrated is described in this embodiment, they may be separated as long as it is possible to detect whether the display unit bends more than the threshold.

Displaying objects, such as icons, menu items, an image, are displayed on the display unit 105. On the display unit 105, the touch panel 120 is piled up and the user can scroll the icons, the menu items, etc. (change a display range) by flicking or dragging the touch panel 120. The operation unit 106 is provided with a power button for the information device 100, a button for canceling an operation, etc.

Next, a difference between display contents of menus during scrolling operations in cases where the information device 100 is in the straight state and where the information device 100 is in the rolled state will be described.

Figure 4A:
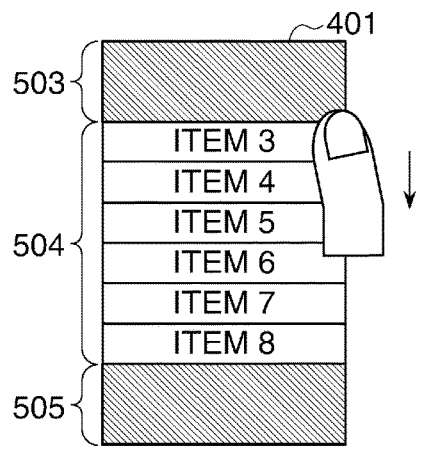
FIG. 4A through FIG. 4C are views showing an example of a change of contents displayed on the information device in FIG. 1 in the straight state when a user scrolls a displaying object in a downward direction in a screen.
Figure 4B:
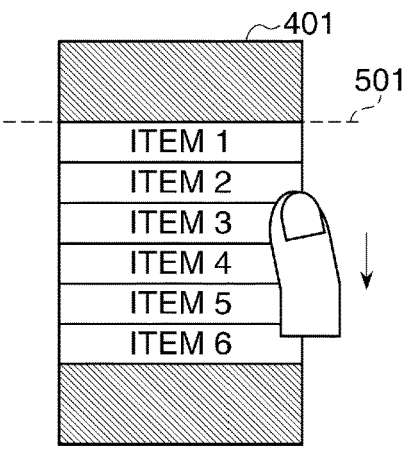
Figure 4C:
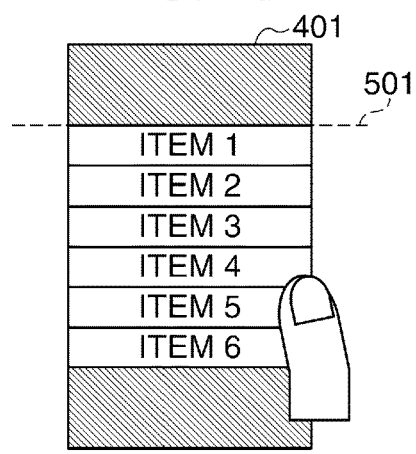
Figure 4D:
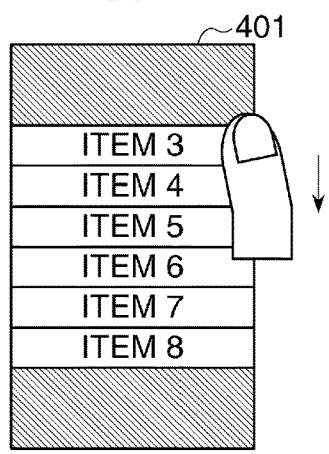
FIG. 4D through FIG. 4F are views showing an example of a change of contents displayed on the information device in FIG. 1 in the rolled state when the user scrolls the displaying object in the downward direction in the screen.
Figure 4E:
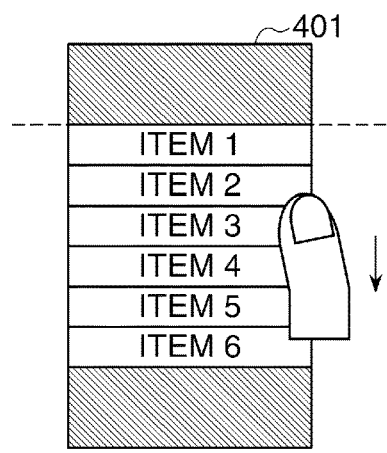
Figure 4F:
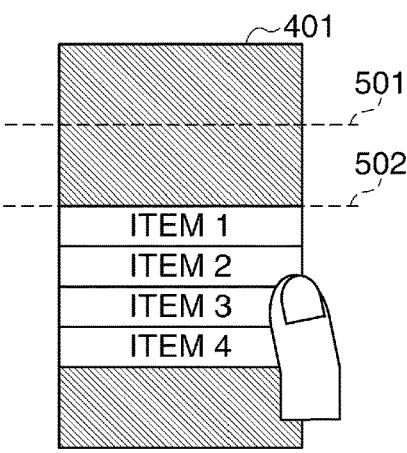

FIG. 4A through FIG. 4C are views showing an example of a change of contents displayed on the information device 100 in the straight state when a user scrolls the menu in a downward direction in a screen. FIG. 4D through FIG. 4F are views showing an example of a change of contents displayed on the information device 100 in the rolled state when the user scrolls the menu in the downward direction in the screen. In this example, the menu that contains ten menu items arranged in the order of items 1 to 10 will be described. That is, the item 1 is the top of the menu items (top item) contained in the menu, and the item 10 is the bottom of the menu items (last item) of the menu items contained in the menu. As shown in FIG. 4A, the display area of the display unit 105 is divided into an upper display area 503, a menu display area 504, and a lower display area 505. And the menu shall be displayed within the menu display area 504 that is a part of the display area of the display unit 105. The upper display area 503 and the lower display area 505 are used for display a displaying object other than the menu. For example, the display areas 503 and 505 are used for displaying a battery residue, a radio wave state, a notice about a state of resident software, various warnings, a touch button for instructing to finish displaying the menu, and a touch button for changing the displaying object to another object. It should be noted that the entire displayable area of the display unit 105 may be used as the menu display area without providing the upper display area 503 and the lower display area 505. All the ten menu items cannot be displayed within the menu display area 504 at a time, but six items can be displayed at a time. The displayed items (a displayed portion among the menu) can be changed by scrolling.

When the Touch-Move of a finger is performed downwardly in the straight state of the information device 100, the menu is scrolled as shown in FIG. 4A and FIG. 4B. After the upper end of the item 1 that is the top item in the menu reaches the position 501 that is the upper end (the end in a first direction) of the menu display area 504 as shown in FIG. 4B, the menu does not scroll even if the Touch-Move continues as shown in FIG. 4C. The position 501 is referred to as a scrolling-upper-end limit position that indicates a limit over which the upper end of the menu cannot scroll downwardly (in a second direction opposite to the first direction).

On the other hand, when the Touch-Move of a finger is performed downwardly in the rolled state of the information device 100 in the order of FIG. 4D, FIG. 4E, and FIG. 4F, the scrolling-upper-end limit position shifts to a position 502 that is below the upper end of the menu display area 504. Since the scrolling-upper-end limit position 502 in the rolled state is located below the scrolling-upper-end limit position 501 in the straight state, the item 1 that is the top item is able to be scrolled downwardly in the rolled state more than in the straight state. In this state, a blank area that does not display the menu appears above the top of the menu (the item 1) within the menu display area 504. An item other than the menu items may be displayed in the blank area. Moreover, the number of the menu items displayed at once becomes less than six. As a result of this, the item 1 as the top item is scrolled to the position that is easy to see in a case where the information device 100 is wound around a wrist.

Figure 5A:
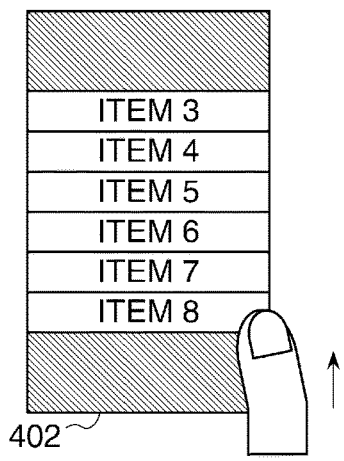
FIG. 5A through FIG. 5C are views showing an example of a change of contents displayed on the information device in FIG. 1 in the straight state when a user scrolls a displaying object in an upward direction in a screen.
Figure 5B:
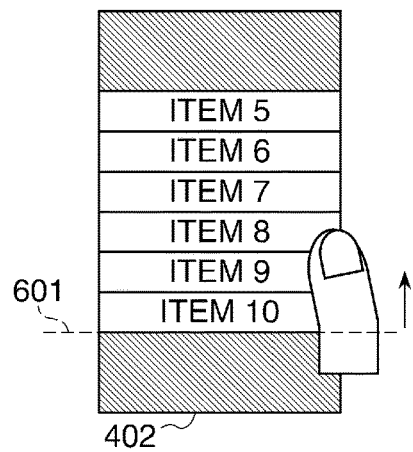
Figure 5C:
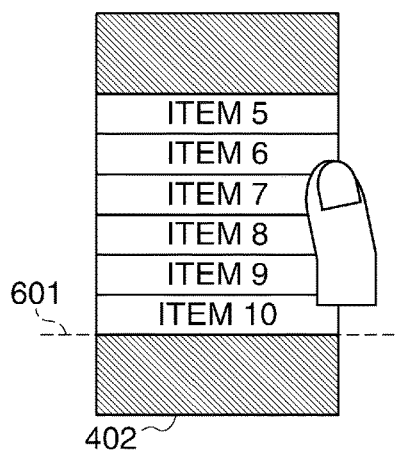
Figure 5D:
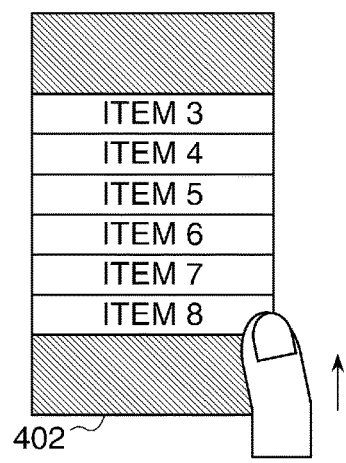
FIG. 5D through FIG. 5F are views showing an example of a change of contents displayed on the information device in FIG. 1 in the rolled state when the user scrolls the displaying object in the upward direction in the screen.
Figure 5E:
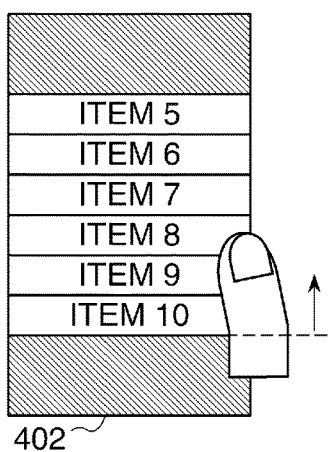
Figure 5F:
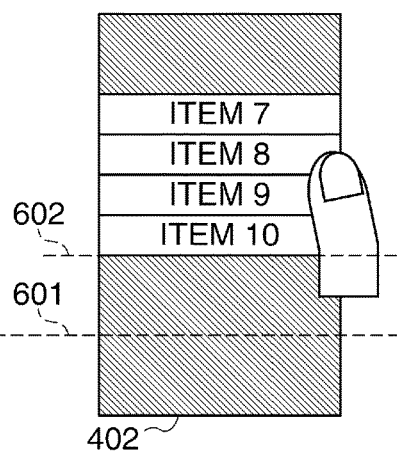

FIG. 5A through FIG. 5C are views showing an example of a change of contents displayed on the information device 100 in the straight state when a user scrolls the menu in an upward direction in a screen. FIG. 5D through FIG. 5F are views showing an example of a change of contents displayed on the information device 100 in the rolled state when the user scrolls the menu in the upward direction in the screen.

When the Touch-Move of a finger is performed upwardly in the straight state of the information device 100, the menu is scrolled as shown in FIG. 5A and FIG. 5B. After the lower end of the item 10 that is the last item in the menu reaches a position 601 that is the lower end of the menu display area 504 as shown in FIG. 5B, the menu does not scroll even if the Touch-Move continues as shown in FIG. 5C. The position 601 is referred to as a scrolling-lower-end limit position that indicates a limit over which the lower end of the menu cannot scroll upwardly.

On the other hand, when the Touch-Move of a finger is performed upwardly in the rolled state of the information device 100 in the order of FIG. 5D, FIG. 5E, and FIG. 5F, the scrolling-lower-end limit position shifts to a position 602. Since the scrolling-lower-end limit position 602 in the rolled state is located above the scrolling-lower-end limit position 601 in the straight state, the item 10 that is the last item is able to be scrolled upwardly in the rolled state more than in the straight state. As a result of this, the item 10 is scrolled to the position that is easy to see in a case where the information device 100 is twisted around a wrist. In this state, a blank area that does not display the menu appears below the lower end of the menu (the item 10) within the menu display area 504. An item other than the menu items may be displayed in the blank area. Moreover, the number of the menu items displayed at once becomes less than six. As a result of this, the item 10 as the last item is scrolled to the position that is easy to see in a case where the information device 100 is twisted around a wrist.

Figure 6:
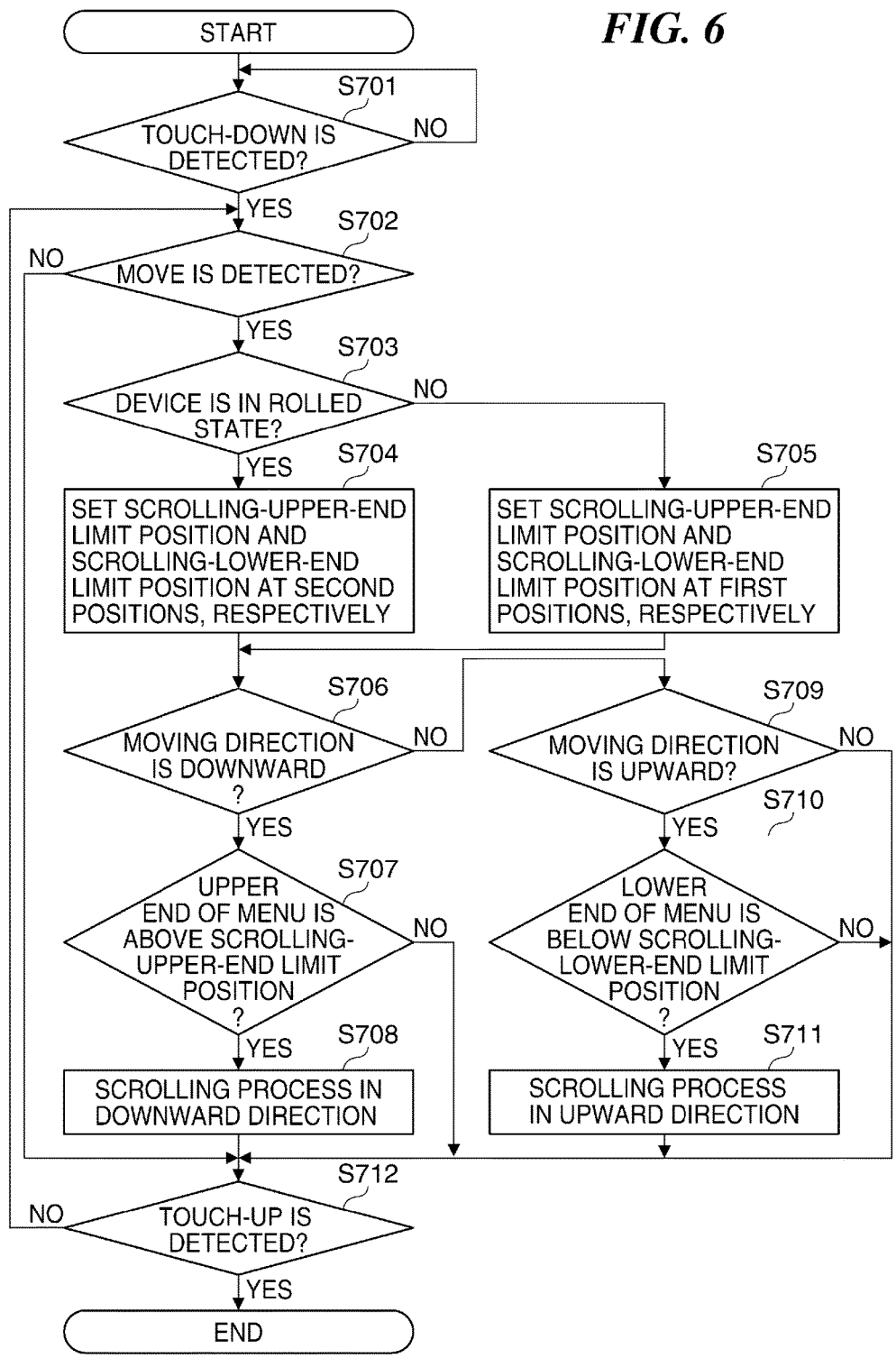
FIG. 6 is a flowchart showing a display control process performed by the information device in the first embodiment at a time of scrolling.

FIG. 6 is a flowchart showing a display control process performed by the information device 100 at the time of scrolling the menu. This process is achieved because the CPU 101 executes a program read from the nonvolatile memory 103.

In step (hereinafter referred to as "S") 701, the CPU 101 determines whether a Touch-Down is detected. When the Touch-Down is detected, the process proceeds to S702. On the other hand, S701 is repeated when a Touch-Down is not detected.

In S702, the CPU 101 determines whether a Touch-Move is detected. When the Touch-Move is detected, the process proceeds to S703. On the other hand, when a Touch-Move is not detected, the process proceeds to S112.

In S703, the CPU 101 determines whether the information device 100 is in the rolled state by reading the value that is A/D-converted with the AD converter connected to the curvature sensor 130. Specifically, the nonvolatile memory 103 stores a rolled-state determination threshold that is used to determine whether the information device 100 is in the rolled state. The CPU 101 compares the A/D-converted value with the rolled-state determination threshold, and determines that it is in the rolled state when the A/D-converted value is larger. When it is determined that the information device 100 is in the rolled state, the process proceeds to S704. On the other hand, when the information device 100 is not in the rolled state, the process proceeds to S705.

In S704, the CPU 101 sets the scrolling-upper-end limit position at a second position 502 shown in FIG. 4F, and sets the scrolling-lower-end limit position at the second position 602 shown in FIG. 5F. Then, the process proceeds to step S706.

In S705, the CPU 101 sets the scrolling-upper-end limit position at the first position 501 shown in FIG. 4B, and sets the scrolling-lower-end limit position at the first position 601 shown in FIG. 5B. Then, the process proceeds to step S706.

In S706, the CPU 101 determines the direction of the Touch-Move detected in S702. When it is determined that the direction of the Touch-Move is downward (that is, there is a downward scrolling instruction operation), the process proceeds to S707. Otherwise, the process proceeds to S709.

In S707, the CPU 101 determines whether the upper end of the menu (the upper end of the item 1) is above the scrolling-upper-end limit position in the menu screen displayed currently. This has the same meaning with whether the portion currently displayed on the menu display area 504 is a portion below the upper end of the menu in the case where the scrolling-upper-end limit position is the first position. It has the same meaning with whether the upper end of the menu is displayed within the menu display area 504 and the upper end of the menu scrolls to the second position that is below the upper end of the menu display area 504 in the case where the scrolling-upper-end limit position is the second position. When it is determined that the upper end of the menu is above the scrolling-upper-end limit position, the process proceeds to S708. Otherwise, the process proceeds to S712.

In S708, the CPU 101 performs a scrolling process that scrolls the menu downwardly at a fixed amount on the display unit 105. Then, the process proceeds to step S712.

In S709, the CPU 101 determines the direction of the Touch-Move detected in S702. When it is determined that the direction of the Touch-Move is upward (that is, there is an upward scrolling instruction operation), the process proceeds to S710. Otherwise, the process proceeds to S712.

In S710, the CPU 101 determines whether the lower end of the menu (the lower end of the item 10) is below the scrolling-lower-end limit position in the menu screen displayed currently. This has the same meaning with whether the portion currently displayed on the menu display area 504 is a portion above the lower end of the menu in the case where the scrolling-lower-end limit position is the first position. It has the same meaning with whether the lower end of the menu is displayed within the menu display area 504 and the lower end of the menu scrolls to the second position that is above the lower end of the menu display area 504 in the case where the scrolling-lower-end limit position is the second position. When it is determined that the lower end of the menu is below the scrolling-lower-end limit position, the process proceeds to S711. Otherwise, the process proceeds to S712.

In S711, the CPU 101 performs a scrolling process that scrolls the menu upwardly at a fixed amount on the display unit 105. Then, the process proceeds to step S712.

In S712, the CPU 101 determines whether a Touch-Up is detected. This process is finished when the Touch-Up is detected. On the other hand, when a Touch-Up is not detected, the touch-on state is continued (that is, the scrolling operation continues), and the process returns to S702.

Figure 11:
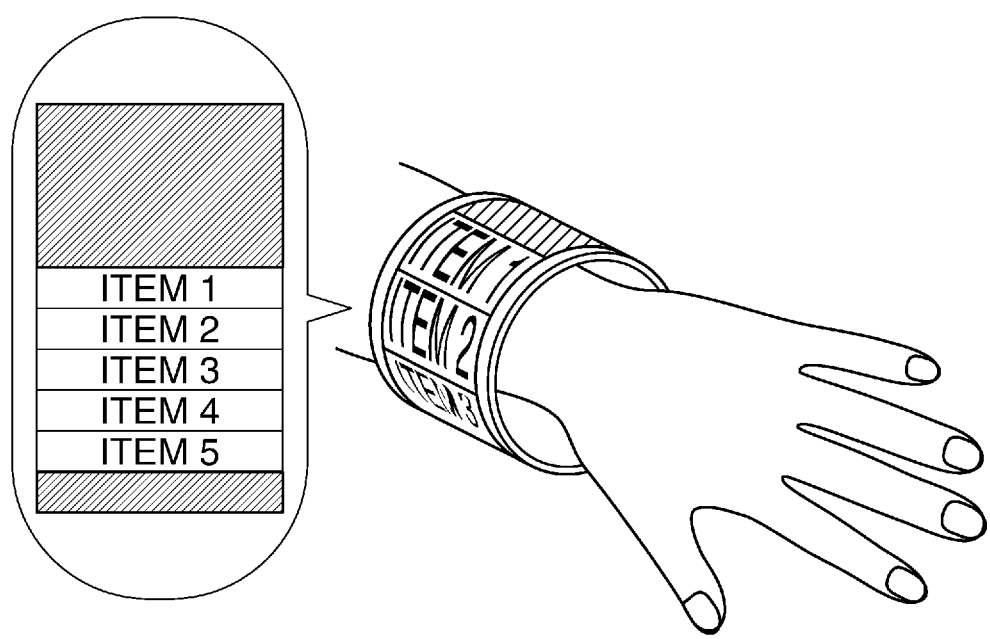
FIG. 11 is a view showing a display example on the display unit of the information device in the first embodiment in the rolled state at the time of scrolling.

As described above, when the information device 100 is in the rolled state, the items of the upper end and the lower end (the top and bottom ends of the item group) are scrolled to the positions that are easy to see in a case where the information device is used by twisting around a wrist like a wrist watch as shown in FIG. 11 in this embodiment. This does not only improve the visibility, but also improves the operability because the upper and lower items of the menu (the top and bottom ends of the item group) are scrolled to positions that are easy to touch when a displayed item can be touched to operate.

According to the above-mentioned configuration, since a user is able to scroll the scrolling object so as to see the upper and lower ends of the displaying object even if the information device that includes the display unit is in the rolled state, the user is able to see and operate icons or menu items at the upper and lower ends smoothly.

Figure 12A:
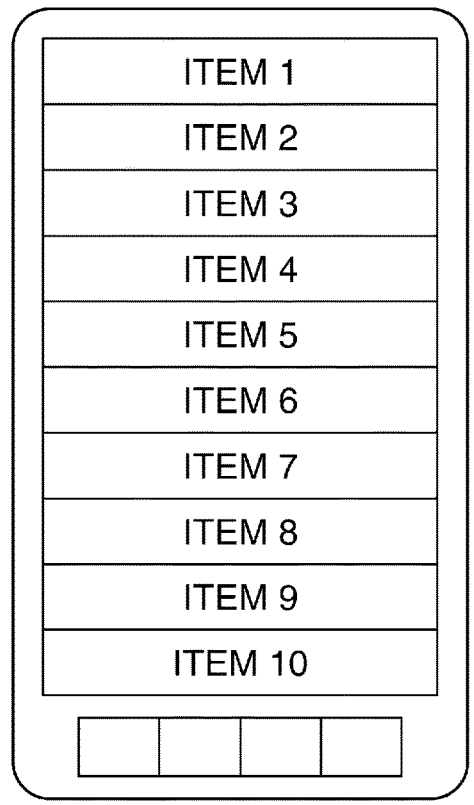
FIG. 12A is a view showing an image of menu items displayed on a display unit of an information device of a comparative example in the straight state.
Figure 12B:
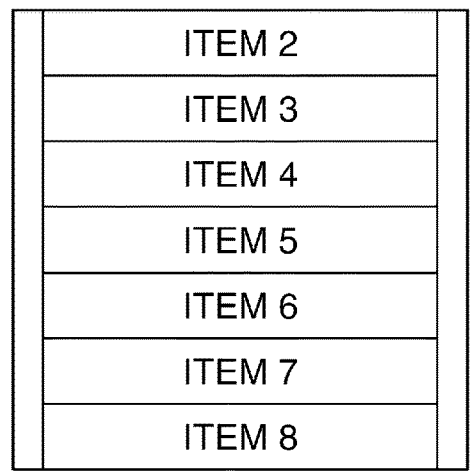
FIG. 12B is a view showing an image of menu items displayed on the display unit of the information device of the comparative example in the rolled state.
Figure 13:
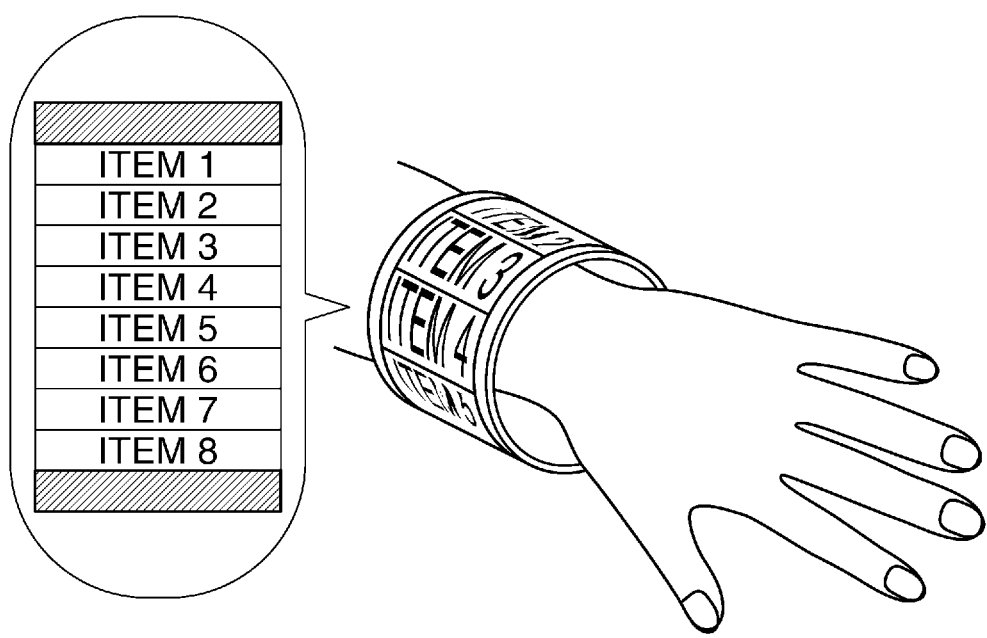
FIG. 13 is a view showing an example of a displaying content at a time when the information device of the comparative example is in the rolled state.

Against this, if the display control in the above-mentioned embodiment is not performed, a user is possible to look out over the entire menu indication as shown in FIG. 12A as long as the information device is in the straight state. On the other hand, when the information device is in the rolled state and is wound around the wrist as shown in FIG. 12B and FIG. 13, since the upper and lower ends of the screen become parallel to a look, the user cannot look out over the entire menu indication. Moreover, even if the user wants to see the upper and lower ends of the screen by twisting the wrist, it is hard to twist the wrist in some directions. In such a situation, the user is hard to see the menu items on the upper and lower ends of the screen, and cannot scroll.

Next, a second embodiment of the present invention will be described. In the second embodiment, the information device 100 is controlled so as not to perform looped displaying at the upper and lower ends of the menu display area at the time of scrolling the menu in the straight state, but is controlled so as to perform the looped displaying in the rolled state. Since the configuration shown in FIG. 1 through FIG. 3 of the above-mentioned first embodiment is common to the second embodiment of the present invention, the same sections are represented by the same reference numerals and the descriptions therefor are omitted. Hereafter, only points different from the first embodiment will be described.

Figure 7A:
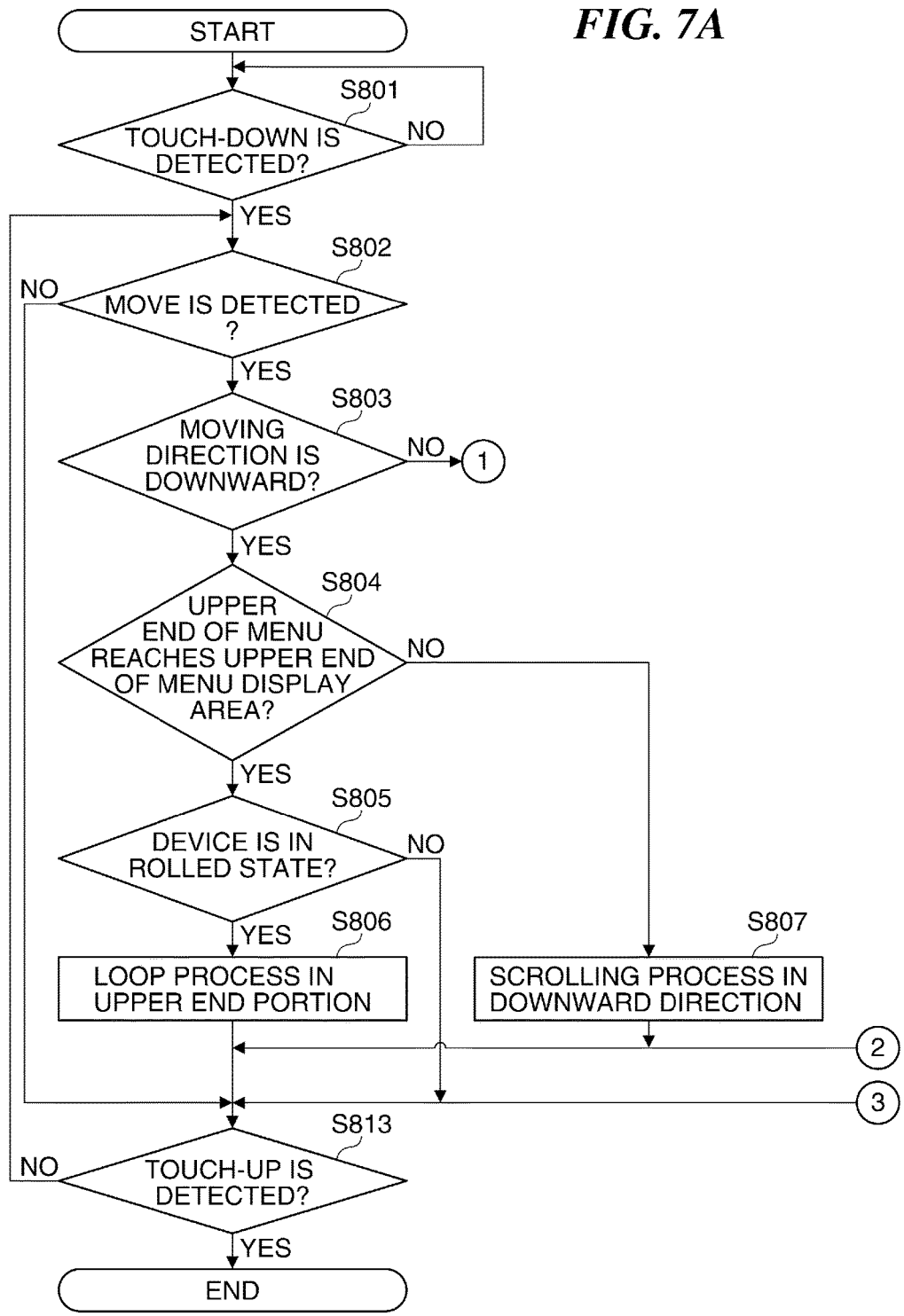
FIG. 7A and FIG. 7B are flowcharts showing a display control process performed by an information device in a second embodiment at a time of scrolling.
Figure 7B:
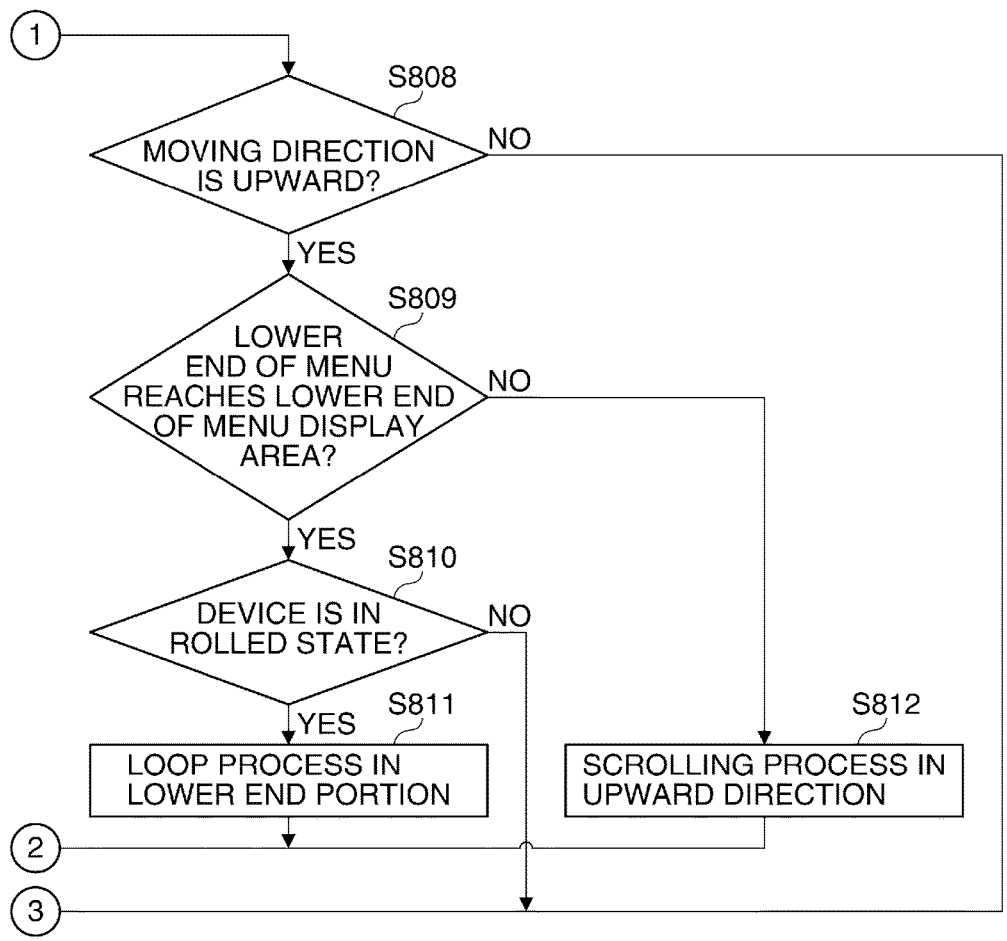

FIG. 7A and FIG. 7B are flowcharts showing a display control process performed by the information device 100 at the time of scrolling the menu. This process is achieved because the CPU 101 executes a program read from the nonvolatile memory 103.

In S801, the CPU 101 determines whether a Touch-Downs is detected. When the Touch-Down is detected, the process proceeds to S802. On the other hand, S801 is repeated when a Touch-Down is not detected.

In S802, the CPU 101 determines whether a Touch-Move is detected. When the Touch-Move is detected, the process proceeds to S803. On the other hand, when a Touch-Move is not detected, the process proceeds to S813.

In S803, the CPU 101 determines the direction of the Touch-Move detected in S802. When it is determined that the direction of the Touch-Move is downward (that is, there is a downward scrolling instruction operation), the process proceeds to S804. Otherwise, the process proceeds to S808.

In S804, the CPU 101 determines whether the upper end of the menu that is currently displayed on the display unit 105 reaches the upper end 501 (FIG. 4B) of the menu display area. When the upper end of the menu (the upper end of the item 1) reaches the upper end of the menu display area, the process proceeds to S805. Otherwise, the process proceeds to S807.

In S805, the CPU 101 determines whether the information device 100 is in the rolled state by reading the value that is A/D-converted with the AD converter connected to the curvature sensor 130. Specifically, the nonvolatile memory 103 stores a rolled-state determination threshold that is used to determine whether the information device 100 is in the rolled state. The CPU 101 compares the A/D-converted value with the rolled-state determination threshold, and determines that it is in the rolled state when the A/D-converted value is larger. When it is determined that the information device 100 is in the rolled state, the process proceeds to S806. On the other hand, when the information device 100 is not in the rolled state, the process proceeds to S807.

In S806, the CPU 101 controls the image processing unit 104 to perform a loop process in the upper end portion of the menu. Specifically, the display unit is controlled so that the lower end of the menu (the lower end of the item 10) appears from the upper end of the display unit as the upper end of the menu (the upper end of the item 1) scrolls downwardly from the upper end of the display unit. Then, the process proceeds to step S813.

In S807, the CPU 101 performs the scrolling process that scrolls the menu that is currently displayed on the display unit 105 downwardly at a fixed amount. Then, the process proceeds to S813.

In S808, the CPU 101 determines the direction of the Touch-Move detected in S802. When it is determined that the direction of the Touch-Move is upward (that is, there is an upward scrolling instruction operation), the process proceeds to S809. Otherwise, the process proceeds to S813.

In S809, a the CPU 101 determines whether the lower end of the menu that is currently displayed on the display unit 105 reaches the lower end of the menu display area 504 (FIG. 4A). When the lower end of the menu reaches the lower end of the menu display area, the process proceeds to S810. Otherwise, the process proceeds to S812.

In S810, the CPU 101 determines whether the information device 100 is in the rolled state. Since S810 is identical to S805, its description is omitted. When it is determined that the information device 100 is in the rolled state, the process proceeds to S811. On the other hand, when the information device 100 is not in the rolled state, the process proceeds to S813.

In S806, the CPU 101 controls the image processing unit 104 to perform a loop process in the lower end portion of the menu. Specifically, the display unit is controlled so that the upper end of the menu (the upper end of the item 1) appears from the lower end of the display unit as the lower end of the menu (the lower end of the item 10) scrolls upwardly from the lower end of the display unit. Then, the process proceeds to S813.

In S812, the CPU 101 performs the scrolling process that scrolls the menu that is currently displayed on the display unit 105 upwardly at a fixed amount. Then, the process proceeds to S813.

In S813, the CPU 101 determines whether a Touch-Up is detected. This process is finished when the Touch-Up is detected. On the other hand, when a Touch-Up is not detected, the Touch-On state is continued (that is, the scrolling operation continues), and the process returns to S802.

As described above, when the information device 100 is in the straight state, the scrolling is restricted so as not to scroll when the menu reaches the upper end or the lower end of the menu display area during the scrolling of the menu. On the other hand, when the information device 100 is in the rolled state, the display unit is controlled so that the upper end of the menu appears from the lower end of the menu display area (loop display) when the upper end of the menu reaches the upper end of the menu display area during the scrolling of the menu. Furthermore, when the lower end of the menu reaches the lower end of the menu display area, the display unit is controlled so that the lower end of the menu appears from the upper end of the menu display area (loop display).

According to the above-mentioned configuration, since a user is able to scroll the menu as the scrolling object so as to see the upper and lower ends of the menu even if the information device is in the rolled state, the user is able to see and operate the portions at the upper and lower ends smoothly.

In this embodiment, the loop display is not performed when the information device 100 is in the straight state. However, the loop display may be performed even in the straight state when a user once finishes the scrolling operation (Touch-Up) and performs the scrolling instruction operation in the same direction again.

Next, a third embodiment of the present invention will be described. There is a known scrolling control to automatically return an end of a menu to an end of a menu display area when a user scrolls the menu so that the end of the menu goes away from the end of the menu display area and releases a finger from a display unit. In such a case, the third embodiment of the present invention controls so that the distance between the end of the menu after returning to the end of the menu display area and the end of the menu display area in the rolled state is larger than that in the straight state of the information device 100. Since the configuration shown in FIG. 1 through FIG. 3 of the above-mentioned first embodiment is common to the third embodiment of the present invention, the same sections are represented by the same reference numerals and the descriptions therefor are omitted. Hereafter, only points different from the first embodiment will be described.

Figure 8A:
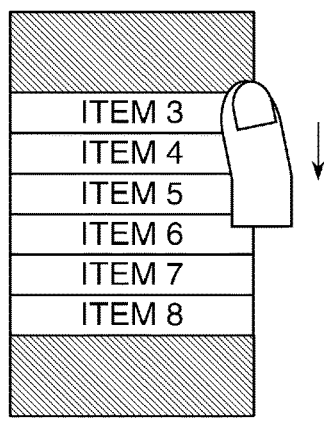
FIG. 8A through FIG. 8C are views showing an example of a change of contents displayed on the information device in the second embodiment in the straight state when a user scrolls a displaying object in a downward direction in a screen and releases a finger from the screen.
Figure 8B:
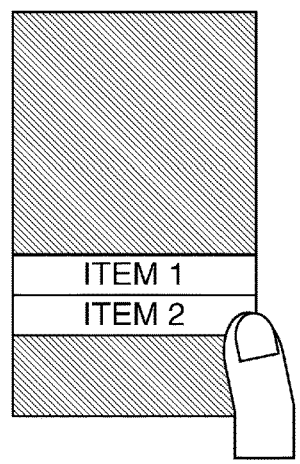
Figure 8C:
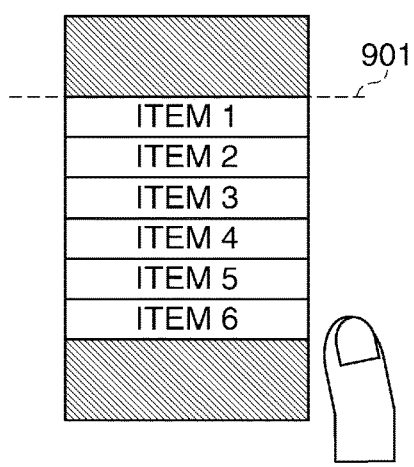
Figure 8D:
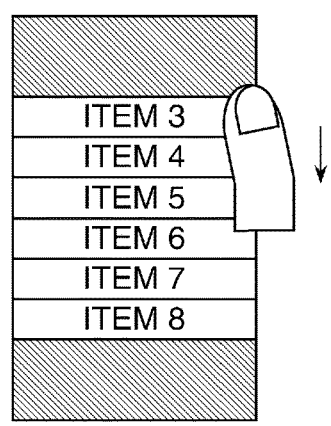
FIG. 8D through FIG. 8F are views showing an example of a change of contents displayed on the information device in the second embodiment in the rolled state when the user scrolls the displaying object in the downward direction in the screen and releases the finger from the screen.
Figure 8E:
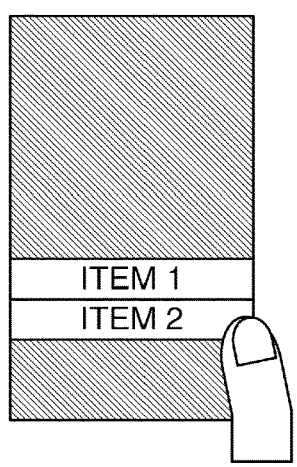
Figure 8F:
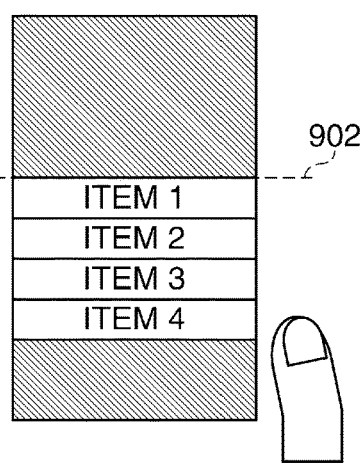

FIG. 8A through FIG. 8C are views showing an example of a change of contents displayed on the information device 100 in the straight state when a user scrolls the menu in a downward direction in a screen and releases a finger from the screen. FIG. 8D through FIG. 8F are views showing an example of a change of contents displayed on the information device 100 in the rolled state when the user scrolls the menu in the downward direction in the screen and releases the finger from the screen.

When the user performs the Touch-Move downwardly with the finger on the display unit 105 of the information device 100 in the straight state in the order shown in FIG. 8A and FIG. 8B and releases the finger from the display unit 105, the menu automatically scrolls until the upper end of the menu reaches the upper end position 901 of the menu display area as shown in FIG. 8C. The position 901 is referred to as a scrolling-upper-end return position (a first position) that shows the position to which the upper end of the menu returns. On the other hand, the scrolling-upper-end return position in case where the information device 100 is in the rolled state shifts to a second position 902 as shown in FIG. 8D through FIG. 8F. Since the position 902 is below the scrolling-upper-end return position 901 in the straight state, the distance between the upper end of the menu after scrolling and the upper end of the menu display area in the rolled state is larger than that in the straight state.

Figure 9A:
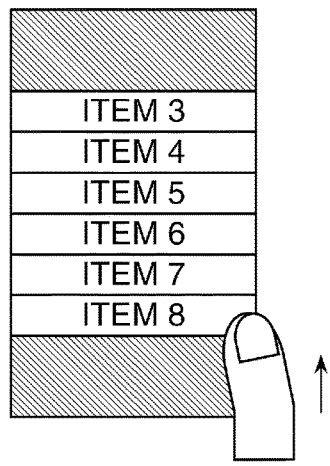
FIG. 9A through FIG. 9C are views showing an example of a change of contents displayed on the information device in the second embodiment in the straight state when a user scrolls a displaying object in an upward direction in a screen and releases a finger from the screen.
Figure 9B:
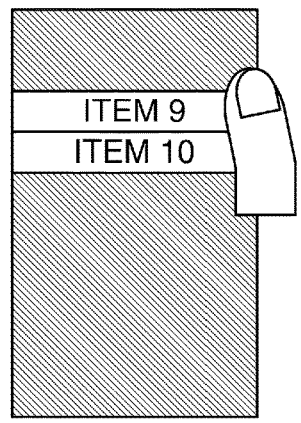
Figure 9C:
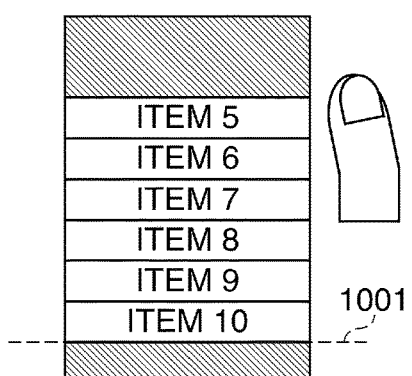
Figure 9D:
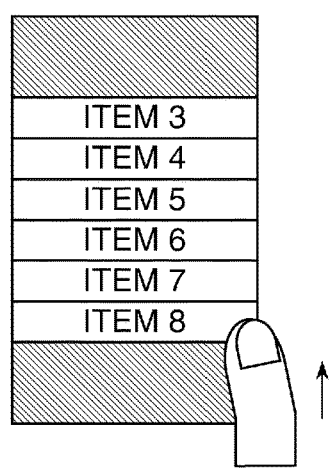
FIG. 9D through FIG. 9F are views showing an example of a change of contents displayed on the information device in the second embodiment in the rolled state when the user scrolls the displaying object in the upward direction in the screen and releases the finger from the screen.
Figure 9E:
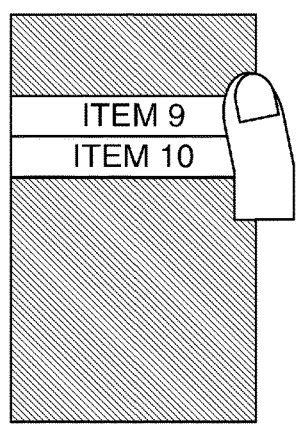
Figure 9F:
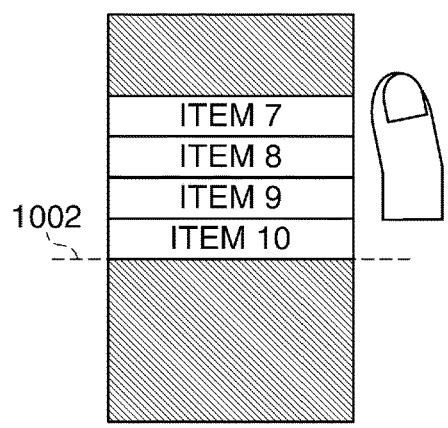

FIG. 9A through FIG. 9C are views showing an example of a change of contents displayed on the information device 100 in the straight state when the user scrolls the menu in the upward direction in the screen and releases the finger from the screen. FIG. 9D through FIG. 9F are views showing an example of a change of contents displayed on the information device 100 in the rolled state when the user scrolls the menu in the upward direction in the screen and releases the finger from the screen.

When the information device 100 is in the straight state, a scrolling-lower-end return position that shows the position to which the lower end of the menu returns automatically is set to a first position 1001. On the other hand, when the information device 100 is in the rolled state, the scroll-lower-end return position is set to a second position 1002.

Figure 10A:
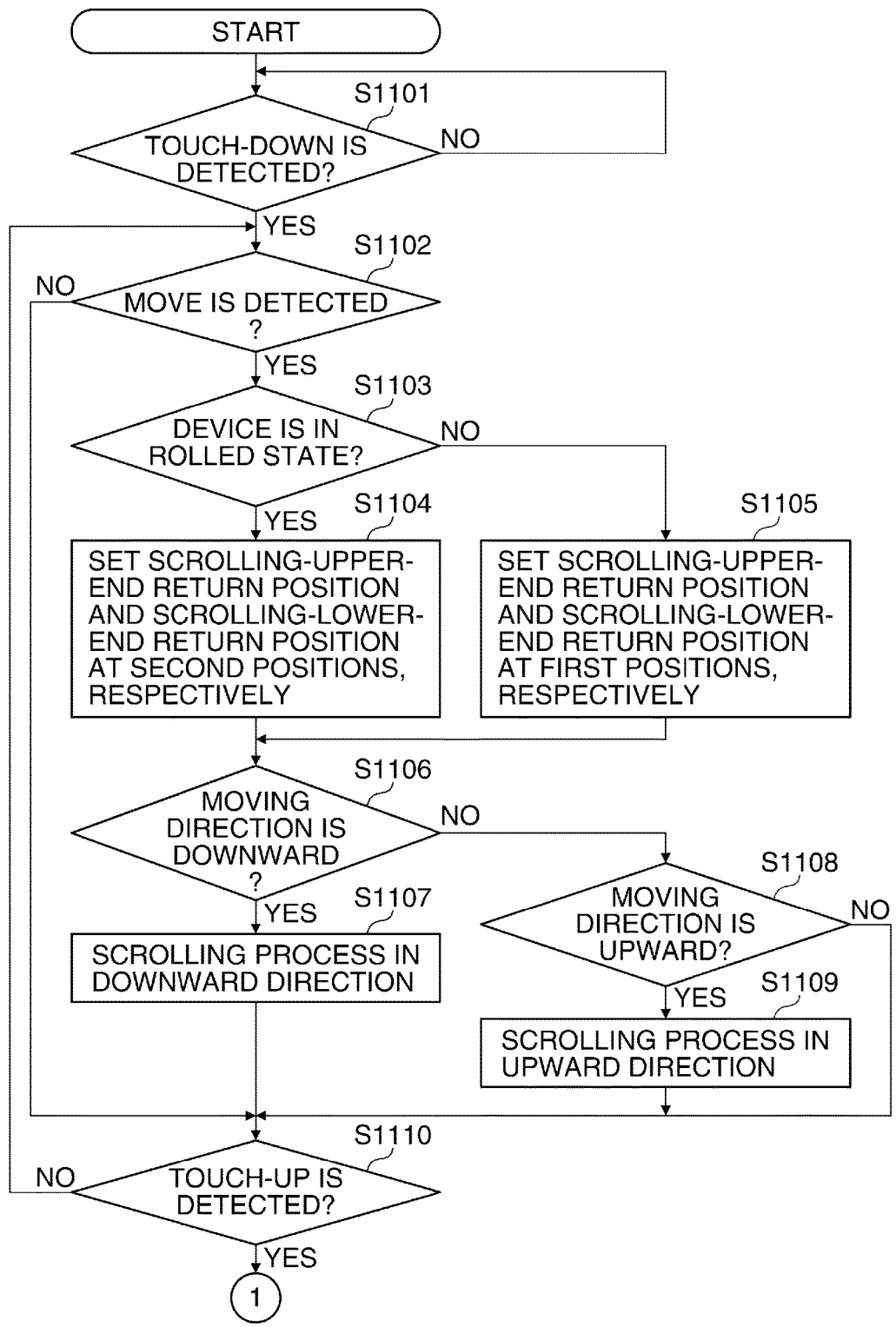
FIG. 10A and FIG. 10B are flowcharts showing a display control process performed by an information device in a third embodiment at a time of scrolling.
Figure 10B:
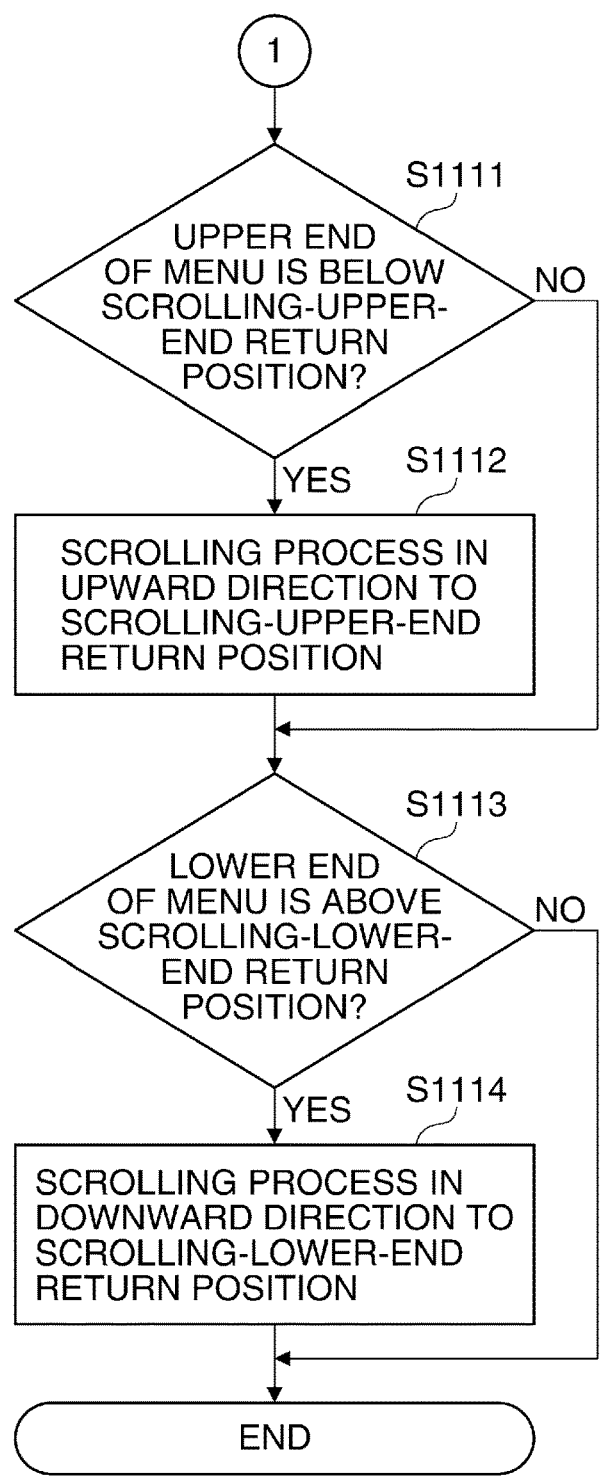

FIG. 10A and FIG. 10B are flowcharts showing a display control process performed by the information device 100 at the time of scrolling the menu. This process is achieved because the CPU 101 executes a program read from the nonvolatile memory 103.

In S1101, the CPU 101 determines whether a Touch-Downs is detected. When the Touch-Down is detected, the process proceeds to S1102. On the other hand, S1101 is repeated when a Touch-Down is not detected.

In S1102, the CPU 101 determines whether a Touch-Move is detected. When the Touch-Move is detected, the process proceeds to S1103. On the other hand, when a Touch-Move is not detected, the process proceeds to S1110.

In S1103, the CPU 101 determines whether the information device 100 is in the rolled state. Since the determination method in S1103 is identical to that in S805 in FIG. 7A, its description is omitted. When it is determined that the information device 100 is in the rolled state, the process proceeds to S1104. On the other hand, when the information device 100 is not in the rolled state, the process proceeds to S1105.

In S1104, the CPU 101 sets the scrolling-upper-end return position at the second position 902 shown in FIG. 8F, and sets the scrolling-lower-end return position at the second position 1002 shown in FIG. 9F. Then, the process proceeds to step S1106.

In S1105, the CPU 101 sets the scrolling-upper-end return position at the first position 901 shown in FIG. 8C, and sets the scrolling-lower-end return position at the first position 1001 shown in FIG. 9C. Then, the process proceeds to step S1106.

In S1106, the CPU 101 determines the direction of the Touch-Move detected in S1102. When it is determined that the direction of the Touch-Move is downward (that is, there is a downward scrolling instruction operation), the process proceeds to S1107. Otherwise, the process proceeds to S1108.

In S1107, the CPU 101 controls the image processing unit 104 to scroll the menu that is currently displayed on the display unit 105 in the downward direction at a fixed amount. Then, the process proceeds to S1110.

In S1108, the CPU 101 determines the direction of the Touch-Move detected in S1102. When it is determined that the direction of the Touch-Move is upward (that is, there is an upward scrolling instruction operation), the process proceeds to S1109. Otherwise, the process proceeds to S1110.

In S1109, the CPU 101 controls the image processing unit 104 to scroll the menu that is currently displayed on the display unit 105 in the upward direction at a fixed amount. Then, the process proceeds to S1110.

In S1110, the CPU 101 determines whether a Touch-Up is detected. When the Touch-Up is detected, the process proceeds to S1111. On the other hand, when a Touch-Up is not detected, the Touch-On state is continued (that is, the scrolling operation continues), and the process returns to S1102.

In S1111, the CPU 101 determines whether the upper end of the menu that is currently displayed on the display unit 105 is below the scrolling-upper-end return position. When it is determined that the upper end of the menu is below the scrolling-upper-end return position, the process proceeds to S1112. Otherwise, the process proceeds to S1113.

In S1112, the CPU 101 performs the scroll process upwardly until the upper end of the menu that is currently displayed on the display unit 105 reaches the scroll-upper-end return position. Then, the process proceeds to S1113.

In S1113, the CPU 101 determines whether the lower end of the menu that is currently displayed on the display unit 105 is above the scrolling-lower-end return position. When it is determined that the lower end of the menu is above the scrolling-lower-end return position, the process proceeds to S1114. Otherwise, this process is finished.

In S1114, the CPU 101 performs the scroll process downwardly until the lower end of the menu that is currently displayed on the display unit 105 reaches the scroll-lower-end return position, and finishes this process.

As described above, when the menu automatically returns to the end of the menu display area when a finger is released from the display unit after scrolling the menu being away from the end of the menu display area, the distance between the end of the menu returned to the end of the menu display area and the end of the menu display area becomes larger in the rolled state.

Since the above-mentioned configuration decreases the returning amount of the menu that is automatically scrolled when the user scrolls the menu to the position where the upper or lower end of the menu is seen in the rolled state, the item arranged at the upper or lower end stays near the center of the display unit, which enables the user to operate smoothly.

In the above-mentioned first through third embodiments, when the information device 100 is in the rolled state, the display control process has been performed for the scrolling in both the upward and downward directions. However, the display control process may be performed for one of the upward and downward directions. For example, there is a possibility that the user can operate the upper portion of the display unit easily and cannot operate the lower portion easily depending on a situation where the information device is wound around a wrist in the rolled state. In such a case, the problem of the present invention is solved by performing the display control process only for the downward scrolling in the rolled state.

Although each of the above-mentioned embodiments describes the example of the display control for scrolling in the upward and downward directions, the display control is not limited to the embodiments depending on an orientation of the device, an orientation of a displaying object, and a usage. For example, the display control is applicable to a process at a right end, a left end, and other ends. The present invention is applicable to an end position that is easily to see in the straight state but is difficult to see in the rolled state.

Moreover, each of the above-mentioned embodiments describes the example to scroll the menu. However, the scrolling object is not limited to the menu. The present invention is applicable to another displaying object (a displaying item, a scrolling object) that can be scrolled. For example, the present invention is applicable to a case where listed images or icons are scrolled. In this case, it is applicable as with the above-mentioned embodiments by using an "image" and an "icon" instead of the "item" of the above-mentioned menu. Moreover, the present invention is applicable to a case where one image is enlarged and displayed and to a case where a part of one document, such as a Web page, a table of spreadsheet software, a document, and a map, is displayed in a display area. For example, when an image is enlarged, a part of the image is enlarged and displayed within the display area, and a user scrolls the image for displaying another part. At this time, the present invention is applicable by treating the upper and lower end of the image as the upper and lower ends of the menu in each of the above-mentioned embodiments.

Although the example to perform the Touch-Move as the operation method for instructing scrolling is described in each of the above-mentioned embodiments, the operation for instructing scrolling is not limited to this. For example, a press of a scrolling instruction button in the operation unit 106 may be treated as an operation for instructing scrolling. An operation according to a direction to a direction instruction member, such as a four-direction button, a joy stick, and a trackball, may be treated as an operation for instructing scrolling. Scrolling may be caused by an operation of giving voice or vibration, an operation of inclining the information device 100, etc.

Although the example that determines whether the information device 100 is in the rolled state by reading the A/D converted value from the A/D converter connected to the curvature sensor 130 is described in each of the above-mentioned embodiments, the determination method is not limited to this. Another determination method may be employed as long as it is capable of determining whether the information device 100 is in the rolled state (whether the information device 100 is not in the straight state). For example, if the bending degree cannot be detected, the following method may be employed for determination. That is, when the information device 100 is wound around an arm like a wrist watch, an upper connection part (not shown) and a lower connection part (not shown) of the information device 100 are connected, and the information device 100 is fixed in the rolled state. Accordingly, if the connection between the upper connection part and the lower connection part of the information device 100 is detectable, it is determined that the information device 100 is in the rolled state according to the detection of the connection. Moreover, if a user explicitly sets whether the information device 100 is in the straight state or the rolled state by operating a setting menu or a slide switch member, it is determined that the information device 100 is in the straight state or the rolled state on the basis of the setting state.

It should be noted that the control process that is described as to be performed by the CPU 101 may be performed with one hardware unit or the control of the entire device may be shared among a plurality of hardware units.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

Although the examples of the present invention applied to the information device are described in the above-mentioned embodiments, the present invention is not limited to these embodiments. That is, the present invention is applicable to a personal computer, a PDA, a cell phone terminal, a portable image viewer, and a printer device with a display unit, a digital photo frame, a music player, a game machine, an electronic-book reader, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-027507, filed Feb. 16, 2015, which is hereby incorporated by reference herein in its entirety.

What is claimed is:

1. A display control apparatus comprising:
   an input device which receives a scrolling operation for scrolling a displaying object that is displayed on a predetermined display area of a bendable display unit; and
   a memory and at least one processor which function as:
   a control unit configured to control scrolling of the displaying object according to the scrolling operation based on whether the bendable display unit is in a first shape at which a display surface of the bendable display unit is straight or in a second shape at which the display surface of the bendable display unit is in an outwardly projecting arc,
   wherein the control unit is configured
   to control to scroll the displaying object according to the scrolling operation so that a first end of the displaying object in a first direction does not scroll beyond a first position in a second direction opposite to the first direction within the predetermined display area in a case where the bendable display unit is in the first shape, and
   to control to scroll the displaying object according to the scrolling operation so that the first end of the displaying object is able to scroll beyond the first position in the second direction and is able to scroll to a second position that shifts from the first position in the second direction in a case where the bendable display unit is in the second shape, wherein the bendable display unit is larger in a bending degree in the second shape than in the first shape; and wherein the bendable display unit has an active display area including a first direction-side area that extends from the second position in the first direction, and the first direction-side area also is able to display the displaying object in a case where the bendable display unit is in the second shape.

2. The display control apparatus according to claim 1, wherein the memory and the at least one processor further function as a determination unit configured to determine whether the bendable display unit is in the first shape or the second shape, and
wherein said control unit controls according to the result of said determination unit.

3. The display control apparatus according to claim 2, wherein said determination unit determines based on an output from a bending sensor that detects a bending degree of the bendable display unit.

4. The display control apparatus according claim 1, wherein said control unit controls scrolling the displaying object according to the scrolling operation so that the first end of the displaying object does not scroll beyond the second position that shifts from the first position in the second direction, when the bendable display unit is in the second shape.

5. The display control apparatus according claim 1, wherein said control unit controls so as not to scroll the displaying object even if the scrolling operation in the second direction is received, when the bendable display unit is in the first shape and when the first end of the displaying object is displayed at the first position within the predetermined display area.

6. The display control apparatus according to claim 1, wherein the first position is an end position in the predetermined display area in the first direction.

7. The display control apparatus according to claim 1, wherein said control unit controls so that a second end of the displaying object in the second direction is displayed from an end position in the display area in the first direction, when the bendable display unit is in the second shape and when the scrolling operation instructs to display the first end of the displaying object at a position in the predetermined display area beyond the first position in the second direction.

8. The display control apparatus according to claim 1, wherein the first direction is one of an upward direction and a downward direction.

9. The display control apparatus according to claim 1, wherein the displaying object comprises an item group that includes a plurality of items.

10. The display control apparatus according to claim 9, wherein the plurality of items comprise at least one of an image, a menu item, and an icon.

11. The display control apparatus according to claim 1, wherein the scrolling is an operation that changes a display range from a state where a part of the displaying object is displayed in the predetermined display area to a state where another part of the displaying object is displayed in the predetermined display area.

12. The display control apparatus according to claim 11, wherein the displaying object comprises at least one of an image, a web page, a table, a document, and a map.

13. The display control apparatus according to claim 1, wherein the scrolling operation is an operation to move a touch position while keeping touching on a touch panel.

14. The display control apparatus according to claim 1, wherein a user can use the display control apparatus by winding around a wrist in a case where the bendable display unit is in the second shape.

15. The display control apparatus according to claim 1, wherein a housing of the display control apparatus is rounded into a rolled shape in a case where the bendable display unit is in the second shape.

16. The display control apparatus according to claim 1, wherein the scrolling operation for scrolling the displaying object when the bendable display unit is in the first shape is the same type of scrolling operation as the bendable display unit is in the second shape.

17. The display control apparatus according to claim 1, wherein said control unit controls to perform a loop display of the displaying object in a case where the bendable display unit is in the second shape.

18. The display control apparatus according to claim 17, wherein said control unit controls not to perform the loop display of the displaying object in a case where the bendable display unit is in the first shape.

19. The display control apparatus according to claim 1, wherein the active display area is the same for the bendable display unit in the first shape and in the second shape.

20. A display control apparatus comprising:
an input device which receives a scrolling operation for scrolling a displaying object that is displayed on a predetermined display area of a bendable display unit; and
a memory and at least one processor which function as:
a control unit configured to control scrolling of the displaying object according to the scrolling operation based on whether the bendable display unit is in a first shape at which a display surface of the bendable display unit is straight or in a second shape at which the display surface of the bendable display unit is in an outwardly projecting arc, wherein the control unit is configured to:
control to scroll the displaying object according to the scrolling operation so that the displaying object scrolls in a first direction until a first end of the displaying object in the first direction moves to a first position in response to a termination of the scrolling operation after the displaying object is scrolled until the first end of the displaying object moves beyond the first position in a second direction opposite to the first direction within the predetermined display area during the scrolling operation in a case where the bendable display unit is in the first shape, and
control to scroll the displaying object according to the scrolling operation so that the displaying object scrolls in the first direction until the first end of the displaying object moves to a second position that shifts from the first position in the second direction within the predetermined display area in response to a termination of the scrolling operation after the displaying object is scrolled until the first end of the displaying object moves beyond the second position in the second direction during the scroll operation in a case where the bendable display unit is in the second shape, wherein the bendable display unit is larger in a bending degree in the second shape than in the first shape; and
wherein the bendable display unit has an active display area including a first direction-side area that extends from the second position in the first direction, and the first direction-side area also is able to display the displaying object in a case where the bendable display unit is in the second shape.

21. The display control apparatus according to claim 20, wherein a user can use the display control apparatus by winding around a wrist in a case where the bendable display unit is in the second shape.

22. The display control apparatus according to claim 20, wherein a housing of the display control apparatus is rounded into a rolled shape in a case where the bendable display unit is in the second shape.

23. A control method for a display control apparatus, the control method comprising:
an operation step of receiving a scrolling operation for scrolling a displaying object that is displayed on a predetermined display area of a bendable display unit;
controlling to perform a first control step or a second control step based on whether the bendable display unit is in a first shape at which a display surface of the bendable display unit is straight or in a second shape at which the display surface of the bendable display unit is in an outwardly projecting arc, wherein:
the first control step comprises controlling to scroll the displaying object according to the scrolling operation so that a first end of the displaying object in a first direction does not scroll beyond a first position in a second direction opposite to the first direction within the predetermined display area in a case where the bendable display unit is in the first shape; and
the second control step comprises controlling to scroll the displaying object according to the scrolling operation so that the first end of the displaying object is able to scroll beyond the first position in the second direction and is able to scroll to a second position that shifts from the first position in the second direction in a case where the bendable display unit is in the second shape, wherein the bendable display unit is larger in a bending degree in the second shape than in the first shape; and
wherein the bendable display unit has an active display area including a first direction-side area that extends from the second position in the first direction, and the first direction-side area also is able to display the displaying object in a case where the bendable display unit is in the second shape.

24. A control method for a display control apparatus, the control method comprising:
an operation step of receiving a scrolling operation for scrolling a displaying object that is displayed on a predetermined display area of a bendable display unit;
controlling to perform a first control step or a second control step based on whether the bendable display unit is in a first shape at which a display surface of the bendable display unit is straight or in a second shape at which the display surface of the bendable display unit is in an outwardly projecting arc, wherein:
the first control step comprises controlling to scroll the displaying object according to the scrolling operation so that the displaying object scrolls in a first direction until a first end of the displaying object in the first direction moves to a first position in response to a termination of the scrolling operation after the displaying object is scrolled until the first end of the displaying object moves beyond the first position in a second direction opposite to the first direction within the predetermined display area during the scroll operation in a case where the display unit is in the first shape; and
the second control step comprises controlling to scroll the displaying object according to the scrolling operation so that the displaying object scrolls in the first direction until the first end of the displaying object moves to a second position that shifts from the first position in the second direction within the predetermined display area in response to a termination of the scrolling operation after the displaying object is scrolled until the first end of the displaying object moves beyond the second position in the second direction during the scroll operation in a case where the display unit is in the second shape, wherein the bendable display unit is larger in a bending degree in the second shape than in the first shape; and
wherein the bendable display unit has an active display area including a first direction-side area that extends from the second position in the first direction, and the first direction-side area also is able to the displaying object in a case where the bendable display unit is in the second shape.

25. A non-transitory computer-readable storage medium storing a control program causing a computer to execute a control method for a display control apparatus, the control method comprising:
an operation step of receiving a scrolling operation for scrolling a displaying object that is displayed on a predetermined display area of a bendable display unit;
a step of performing a first control step or a second control step based on whether the bendable display unit is in a first shape at which a display surface of the bendable display unit is straight or in a second shape at which the display surface of the bendable display unit is in an outwardly projecting are, wherein:
the first control step comprises controlling to scroll the displaying object according to the scrolling operation so that a first end of the displaying object in a first direction does not scroll beyond a first position in a second direction opposite to the first direction within the predetermined display area in a case where the bendable display unit is in the first shape; and
the second control step comprises controlling to scroll the displaying object according to the scrolling operation so that the first end of the displaying object is able to scroll beyond the first position in the second direction and is able to scroll to a second position that shifts from the first position in the second direction in a case where the bendable display unit is in the second shape, wherein the bendable display unit is larger in a bending degree in the second shape than in the first shape; and
wherein the bendable display unit has an active display area including a first direction-side area that extends from the second position in the first direction, and the first direction-side area also is able to display the displaying object in a case where the bendable display unit is in the second shape.

26. A non-transitory computer-readable storage medium storing a control program causing a computer to execute a control method for a display control apparatus, the control method comprising:
an operation step of receiving a scrolling operation for scrolling a displaying object that is displayed on a predetermined display area of a bendable display unit;
a step of performing a first control step or a second control step based on whether the bendable display unit is in a first shape at which a display surface of the bendable display unit is straight or in a second shape at which the display surface of the bendable display unit is in an outwardly projecting arc, wherein:
the first control step comprises controlling to scroll the displaying object according to the scrolling operation so that the displaying object scrolls in a first direction until a first end of the displaying object in the first direction moves to a first position in response to a termination of the scrolling operation after the displaying object is scrolled until the first end of the displaying object moves to the first position in a second direction opposite to the first direction within the predetermined display area during the scroll operation in a case where the display unit is in the first shape; and the second control step comprises controlling to scroll the displaying object according to the scrolling operation so that the displaying object scrolls in the first direction until the first end of the displaying object moves to a second position that shifts from the first position in the second direction within the predetermined display area in response to a termination of the scrolling operation after the displaying object is scrolled until the first end of the displaying object moves beyond the second position in the second direction during the scroll operation in a case where the display unit is in the second shape, wherein the bendable display unit is larger in a bending degree in the second shape than in the first shape; and wherein the bendable display unit has an active display area including a first direction-side area that extends from the second position in the first direction, and the first direction-side area also is able to the displaying object in a case where the bendable display unit is in the second shape.

* * * * *